United States Patent
Ponec et al.

(10) Patent No.: US 9,788,141 B2
(45) Date of Patent: Oct. 10, 2017

(54) COMMUNICATING WITH ARRAYS OF MODULE UNITS

(71) Applicant: SunPower Corporation, San Jose, CA (US)

(72) Inventors: Andrew J. Ponec, Fremont, CA (US); Darren Hau, Fremont, CA (US); Benjamin A. Johnson, Richmond, CA (US)

(73) Assignee: SunPower Corporation, San Jose, CA (US)

( * ) Notice: Subject to any disclaimer, the term of this patent is extended or adjusted under 35 U.S.C. 154(b) by 0 days.

(21) Appl. No.: 14/857,738

(22) Filed: Sep. 17, 2015

(65) Prior Publication Data
US 2017/0086013 A1 Mar. 23, 2017

(51) Int. Cl.
*H04W 4/00* (2009.01)

(52) U.S. Cl.
CPC ........... *H04W 4/008* (2013.01); *H04W 4/005* (2013.01)

(58) Field of Classification Search
CPC ........ H02J 3/383; B08B 9/023; B08B 9/0325; H01L 31/048; H01L 31/0516; H01L 31/0201; H01L 31/022433; H01L 31/02245; H01L 31/0504; H01L 31/1896; H01L 31/0445; H01L 31/0443
USPC ...................................... 455/41.1, 41.2, 41.3
See application file for complete search history.

(56) References Cited

U.S. PATENT DOCUMENTS 8,726,458 B1 * 5/2014 Mahr ...................... F24J 2/461
15/340.1

| | | | |
|---|---|---|---|
| 2009/0266353 A1* | 10/2009 | Lee ......................... | B08B 1/008 |
| | | | 126/593 |
| 2011/0137458 A1 | 6/2011 | Hisatani et al. | |
| 2012/0035897 A1* | 2/2012 | Bell ....................... | G09B 29/12 |
| | | | 703/2 |
| 2012/0065936 A1* | 3/2012 | Singamsetti ............ | H02S 50/10 |
| | | | 702/183 |
| 2012/0118348 A1* | 5/2012 | Buller ............... | H01L 31/02021 |
| | | | 136/244 |
| 2013/0162194 A1* | 6/2013 | Woo ......................... | A47L 1/03 |
| | | | 320/101 |
| 2014/0041138 A1 | 2/2014 | Adler et al. | |
| 2014/0150816 A1* | 6/2014 | Potter ...................... | H02S 40/00 |
| | | | 134/6 |
| 2014/0342665 A1* | 11/2014 | Amano ............. | H04W 52/0229 |
| | | | 455/41.1 |
| 2014/0375343 A1* | 12/2014 | Chen ...................... | G01K 13/00 |
| | | | 324/750.02 |

(Continued)

FOREIGN PATENT DOCUMENTS

| | | |
|---|---|---|
| EP | 2 522 991 | 11/2012 |
| WO | WO-2014/112939 | 7/2014 |

OTHER PUBLICATIONS

International Search Report and Written Opinion from PCT/US2016/052555 dated Jan. 17, 2017, 11 pgs.

*Primary Examiner* — Ping Hsieh

(74) *Attorney, Agent, or Firm* — Schwabe, Williamson & Wyatt P.C.

(57) ABSTRACT

Methods and systems include moving a mobile communication unit along a plurality of module units, and exchanging data with one of the plurality of module units based at least upon the mobile communication unit being in proximity to the one of the plurality of module units.

15 Claims, 4 Drawing Sheets

(56) References Cited

U.S. PATENT DOCUMENTS

2015/0096134 A1    4/2015  Jaeger
2015/0280644 A1*  10/2015  Gostein .................. H02S 50/00
                                                  356/72

* cited by examiner

COMMUNICATING WITH ARRAYS OF MODULE UNITS

A. BACKGROUND

This disclosure relates generally to the field of communicating with arrays of electronic module units.

B. BRIEF DESCRIPTION OF THE DRAWINGS

Other objects and advantages may become apparent upon reading the detailed description and upon reference to the accompanying drawings.

Figure 1:
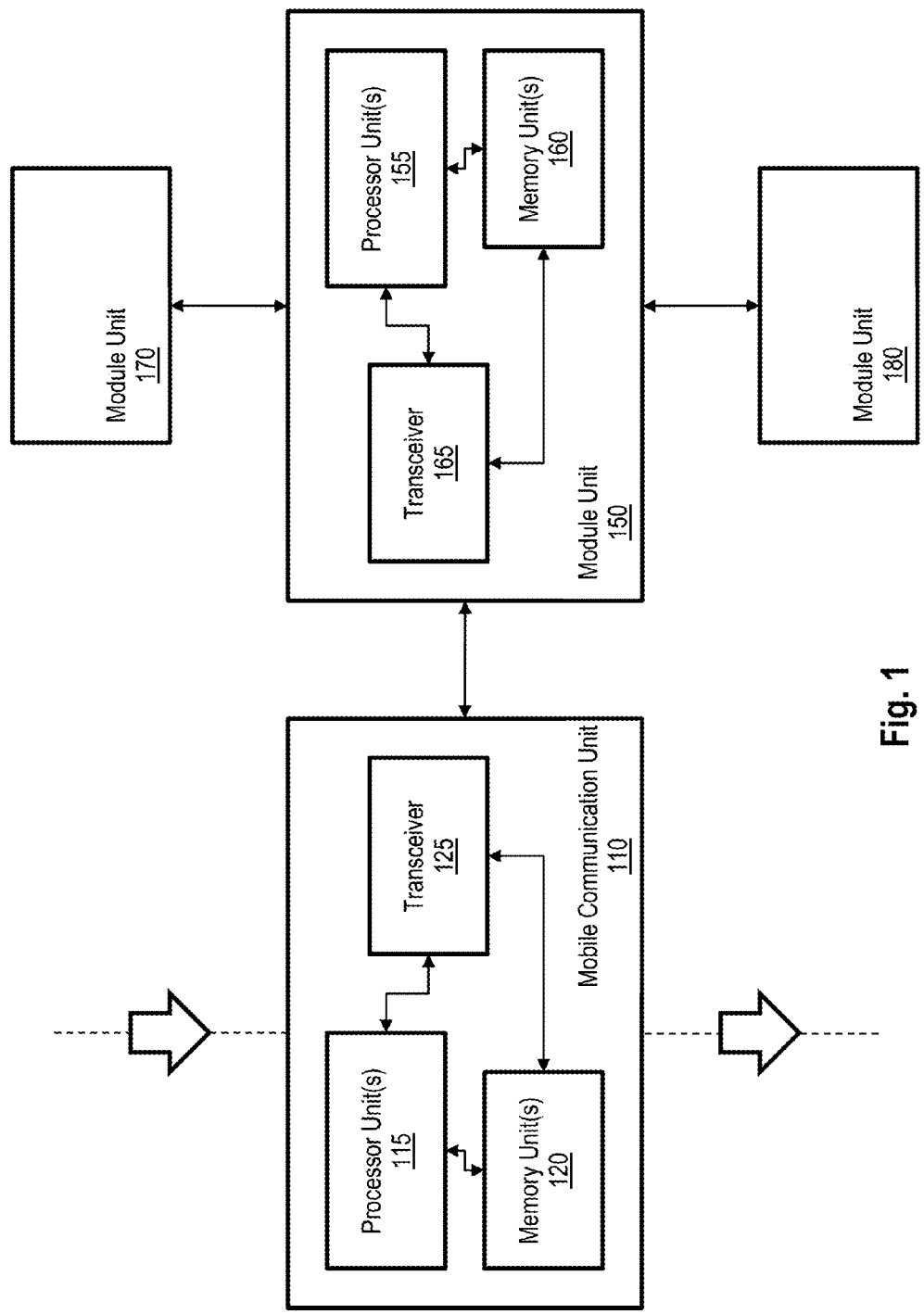
FIG. 1 is a block diagram illustrating a mobile communication unit configured to communicate with multiple module units, in accordance with some embodiments.

While specific embodiments are shown by way of example in the drawings and the accompanying detailed description, various other modifications and alternative forms are possible. It should be understood that the drawings and detailed description are not intended to be limiting.

C. DETAILED DESCRIPTION

The following detailed description is merely illustrative in nature and is not intended to limit the embodiments of the subject matter of the application or uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

TERMINOLOGY

The following paragraphs provide definitions and/or context for terms found in this disclosure (including the appended claims):

"Comprising." This term is open-ended. As used in the appended claims, this term does not foreclose additional structure or steps.

"Configured To." Various units or components may be described or claimed as "configured to" perform a task or tasks. In such contexts, "configured to" is used to connote structure by indicating that the units/components include structure that performs those task or tasks during operation. As such, the unit/component can be said to be configured to perform the task even when the specified unit/component is not currently operational (e.g., is not on/active). Reciting that a unit/circuit/component is "configured to" perform one or more tasks is expressly intended not to invoke 35 U.S.C. §112, sixth paragraph, for that unit/component.

"First," "Second," etc. As used herein, these terms are used as labels for nouns that they precede, and do not imply any type of ordering (e.g., spatial, temporal, logical, etc.). For example, reference to a "first" module unit does not necessarily imply that this module unit is the first module unit in a sequence; instead, the term "first" is used to differentiate this module unit from another module unit (e.g., a "second" module unit).

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

"Coupled"—The following description refers to elements, nodes, or features being "coupled". As used herein, unless expressly stated otherwise, "coupled" means that one element/node/feature is directly or indirectly joined to (or directly or indirectly communicates with) another element/node/feature, and not necessarily mechanically.

"Inhibit"—As used herein, inhibit is used to describe a reducing or minimizing effect. When a component or feature is described as inhibiting an action, motion, or condition it may completely prevent the result or outcome or future state completely. Additionally, "inhibit" can also refer to a reduction or lessening of the outcome, performance, and/or effect which might otherwise occur. Accordingly, when a component, element, or feature is referred to as inhibiting a result or state, it need not completely prevent or eliminate the result or state.

In addition, certain terminology may also be used in the following description for the purpose of reference only, and thus are not intended to be limiting. For example, terms such as "upper", "lower", "above", and "below" refer to directions in the drawings to which reference is made. Terms such as "front", "back", "rear", "side", "outboard", and "inboard" describe the orientation and/or location of portions of the component within a consistent but arbitrary frame of reference which is made clear by reference to the text and the associated drawings describing the component under discussion. Such terminology may include the words specifically mentioned above, derivatives thereof, and words of similar import.

In the following description, numerous specific details are set forth, such as specific operations, in order to provide a thorough understanding of embodiments of the present disclosure. It will be apparent to one skilled in the art that embodiments of the present disclosure may be practiced without these specific details. In other instances, well-known techniques are not described in detail in order to not unnecessarily obscure embodiments of the present disclosure.

FIG. 1 is a block diagram illustrating a mobile communication unit configured to communicate with multiple module units, in accordance with some embodiments.

In some embodiments, mobile communication unit 110 is configured to communicate with multiple module units, such as module units 150, 170, & 180. In some embodiments, mobile communication unit 110 is configured to communicate with a module unit as mobile communication unit 110 reaches a certain level of physical proximity to the module unit. In some embodiments, mobile communication unit 100 is configured to move sequentially in the physical proximity of each module unit and sequentially communicate with each of the module units.

In some embodiments, mobile communication unit 110 comprises one or more processor units 115, which are coupled to one or more memory units 120, and are configured to implement, at least partially, the functionality of mobile communication unit 110. Mobile communication unit 110 may also comprise transceiver 125 that is configured to communicate with module unit 150 as well as other units. Mobile communication unit 110 may comprise other units as well. For example, in embodiments where the mobile communication unit 110 is configured to provide cleaning to the module units, the mobile communication unit 110 may also comprise cleaning tools, cleaning supplies, etc.

Processor units 115 are configured to execute instructions in order to implement the functionality of mobile communication unit 110. Processor units 115 are coupled to and are configured to exchange data with one or more memory units 120, which are configured to store instructions that are to be executed by processor units 115. In some embodiments, the instructions may also be stored in other non-transitory, machine-accessible storage media.

In some embodiments, module unit 150 comprises one or more processor units 155, which are coupled to one or more memory units 160, and are configured to implement, at least partially, the functionality of module unit 150. Mobile communication unit 110 may also comprise transceiver 165 that is configured to communicate with mobile communication unit 110. Module unit 150 may comprise other units as well. In some embodiments, module units 170 and 180 may comprise units and functionality similar to module unit 150.

Processor units 155 are configured to execute instructions in order to implement the functionality of module unit 150. Processor units 155 are coupled to and are configured to exchange data with one or more memory units 160, which are configured to store instructions that are to be executed by processor units 155. In some embodiments, the instructions may also be stored in other non-transitory, machine-accessible storage media.

In some embodiments, the module units may be solar modules that may be deployed in arrays, for example. Moreover, in some embodiments, the functionality of mobile communication unit 110 may be incorporated into mobile cleaning units, which may be otherwise configured to clean the surfaces of the solar modules. The mobile cleaning units, for example, may be configured to physically traverse the array of solar modules and clean the surface of the solar modules in order to maintain the solar modules at an optimum efficiency for receiving sunlight. Accordingly, communication and other appropriate functionality may be added to the mobile cleaning units (with corresponding communication functionality in the module units) such that the mobile cleaning units can exchange data with the solar as the mobile cleaning units are otherwise cleaning the surface of each one of the solar modules. In some embodiments, the mobile cleaning units may exchange data with the solar modules substantially concurrently to the mobile cleaning units cleaning the surface of the solar modules. As one example, a mobile cleaning unit exchanging data with a particular solar module (and its respective module unit) is substantially concurrent to the module cleaning unit cleaning the surface of a solar module if the cleaning and data exchange occur within 10 seconds of one another.

Mobile communication unit 110 and the module units may be configured to communicate with each other using various media and/or various protocols. In some embodiments, for example, short-range wireless radio communications may be used. Short-range wireless communications may be implemented, for example, using relatively inexpensive and relatively simple transceivers on both the mobile communication unit and the module units.

In some embodiments, wired communications may be used. For example, as mobile communication unit 110 moves into the physical proximity of each of the modules, one or more metal contacts on the mobile communication unit may electrically engage corresponding metal contacts on the mobile unit to permit communication between the units. In embodiments where the mobile communication unit may be continuously moving across the module units without stopping at each, the metal contacts may be designed to maintain electrical engagement while this relative motion is taking place. For example, one or both sets of contacts may be made longer in the direction of motion in order to maintain the electrical connection.

In yet other embodiments, the mobile communication unit and the modules may communicate using modulated light (including light in the infrared and/or ultraviolet range). In such embodiments, the mobile communication unit and/or the module units may comprise one or more light sources and one or more light detectors to implement the communication.

It should be noted that, in certain embodiments, combinations of the various communication systems may be used. For example, a different type of communication may be used for one direction and a different type of communication may be used for the other communication direction. In another example, a different type or types of communication may be used for initializing/triggering the communication, and a different type or types of communication may be used for subsequent communications and/or data exchange.

Communication between mobile communication unit 110 and the module units may be initialized using various methods. In some embodiments, a physical trigger may be used. For example, as the mobile communication unit 110 reaches a certain level of proximity to a module unit, a physical trigger (such as a simple toggle switch, for example) may be used to communicate to the module unit that the mobile communication unit is within communication range and to begin the communication protocol. A physical trigger for initializing the communication may be used when the communication being used is wired, wireless radio, light, etc.

In other embodiments, the module units may be configured to periodically search for a wireless initialization command. In response to detecting such an initialization command, the module units may be configured to begin exchanging data with the mobile communication unit. In some embodiments, as the mobile communication unit may, at times, be in constant motion across an array of module units, the period between searches may be such as to ensure that a mobile communication unit is detected while the mobile communication unit is within physical proximity of a module unit.

In embodiments where the module units are solar modules, mobile communication unit 110 may be configured to provide illumination in order to power and switch on the solar module during the data exchange. For example, at times when the communication with the mobile communication unit takes place at night when sunlight is not present, LEDs (or other types of light sources) on the mobile communication unit may provide power and therefore turn on the solar module for communication while the mobile communication unit is in the physical proximity of the solar module. In such embodiments, the solar module may be configured to initiate communication when the solar module is turned on by an external light source.

In some embodiments, light may be used to trigger the communication, power the solar modules, and facilitate the communication. For example, the light may be modulated in order to transmit data. In embodiments where two-way communication is required, a light source may be incorporated into the solar modules and a light detector may be incorporated into the mobile communication unit. In other embodiments, light may be used to trigger the communication and to power the solar modules, but the communication between the mobile communication unit and the solar modules may be implemented using other wireless or wired methods.

Various methods may be used to identify with which module unit in an array of module units mobile communication unit 110 is communicating. In some embodiments, mobile communication unit 110 may comprise a location unit (such a GPS unit) to determine its location and thus the location and identity (through a look-up table, for example) of the module unit with which the mobile communication unit is communicating. In other embodiments, each of the module units may be configured to transmit an identifier to the mobile communication unit or order to identify itself. Other methods may also be used, such as NFC or a simple bar code on each module unit that may be read by the mobile communication unit.

It should be noted that, in some embodiments, a handshake between the mobile communication unit and the module unit may not be implemented. For example, the module unit may be configured to transmit data continuously or periodically, which may be received by the mobile communication unit in response to the mobile communication unit being in proximity of the module unit.

The communication between the module unit and the mobile communication unit may be utilized for various purposes. For example, the mobile communication unit may be configured to initialize the module units with certain operating parameters.

In other embodiments, the mobile communication unit may be configured to collect general health data from each of the module units that may be used to determine the health status of each of the module units.

In yet other embodiments, the mobile communication unit may be configured to reprogram the module units when changes in the configuration of the module units are needed. For example, in embodiments where the module units are solar modules, the mobile communication unit may be configured to reprogram the module parameters that control safety features, such as current, voltage, and/or power limit protection circuits.

It should be noted that, in some embodiments, communication between the mobile communication unit and the module units may be two-way, or one-way from the module units to the mobile communication units, or one-way from the mobile communication units to the module units.

In some embodiments, the mobile communication unit may be configured to move continuously across arrays of module units. As such, the mobile communication unit and the mobile units may be configured to initiate, conduct, and end communication within the period that the mobile communication unit is in close proximity to the module units.

In some embodiments, the mobile communication unit may be configured to keep track with which of the module units the mobile communication unit has communicated. In some embodiments, this communication information may be used to identify units that have defective communication units, for example.

Figure 2:
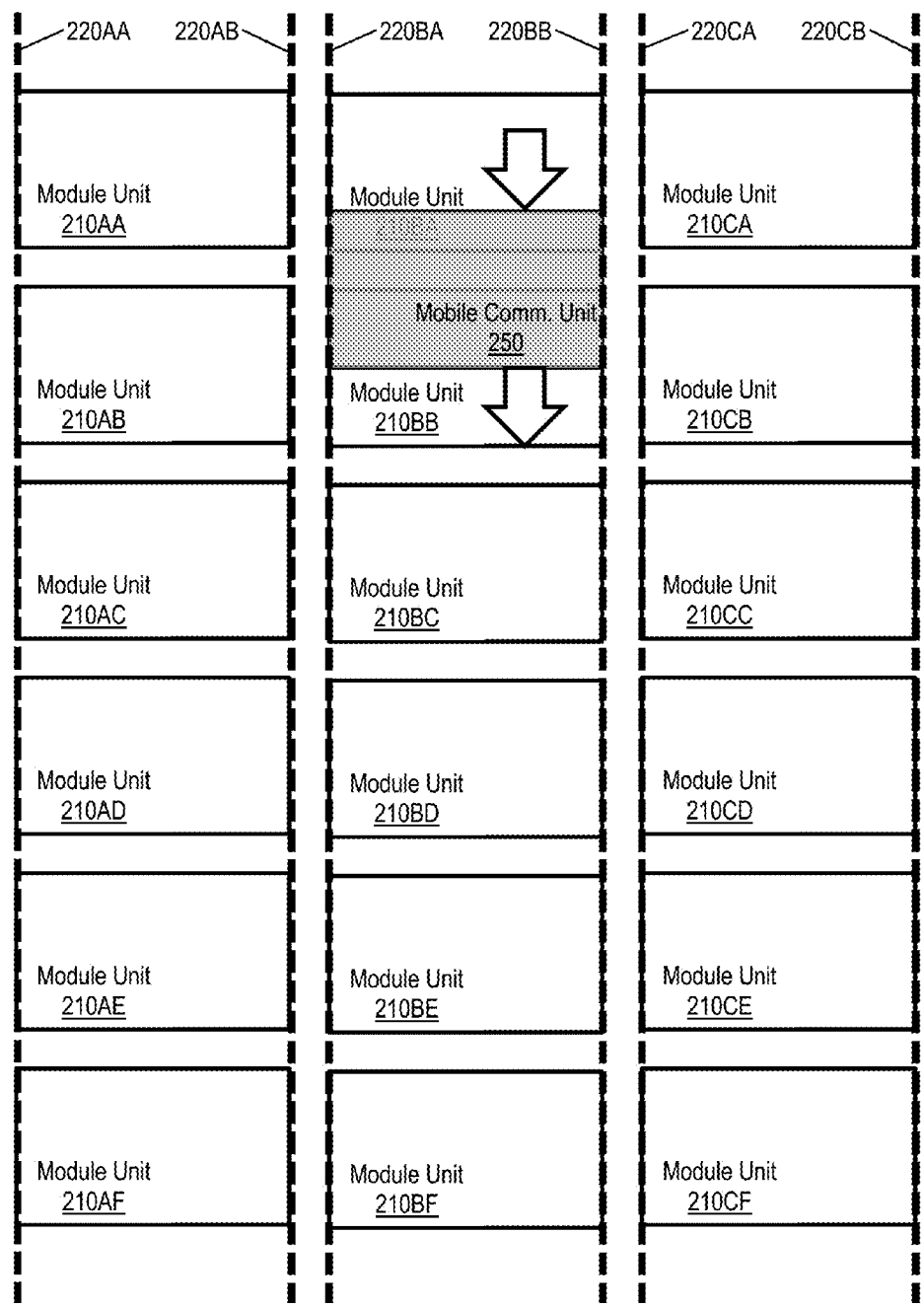
FIG. 2 is a block diagram illustrating a mobile communication unit configured to communicate with an array of module units, in accordance with some embodiments.

FIG. 2 is a block diagram illustrating a mobile communication unit configured to communicate with an array of module units, in accordance with some embodiments.

Three rows of module units (collectively referred to as module units 220) are shown in this example. The first row comprises module units 220AA-220AF, the second row comprises module units 220BA-220BF, and the third row comprises module units 220CA-220CF.

In some embodiments, mobile communication unit 250 may be configured to traverse each of the rows of module units and, while doing so, communicate with each of the module units.

Mobile communication unit 250 may use a variety of methods to traverse the rows of module units 210. For example, the mobile communication unit 250 may be configured to roll on pairs of rails, such as pairs 220AA/220AB, 220BA/220BB, and 220CA/220CB. The mobile communication unit may be placed on each pair of rails manually, communicate with module units in that row, collected manually on the other end, and then placed on the next pair of rails to repeat the process. In other embodiments, an automatic mechanism may be used to switch the mobile communication unit automatically from one pair of rails to the next.

In embodiments where the module units are solar modules, the functionality of the mobile communication units may be included in mobile cleaning devices. Mobile cleaning devices may be configured to clean the surface of the solar modules by traversing the array of solar modules. This process may be performed manually, semi-manually, or fully automatically as discussed above. As the mobile cleaning device traverses the array of solar modules, the mobile cleaning device is, at some point in time, in close physical proximity to each of the solar modules.

Accordingly, the functionality of the mobile communication unit may be included in the mobile cleaning device. As the mobile cleaning device traverses the array, the device may then perform the appropriate communication with each of the solar module as the mobile cleaning device is in close physical proximity to each of the solar modules.

Figure 3:
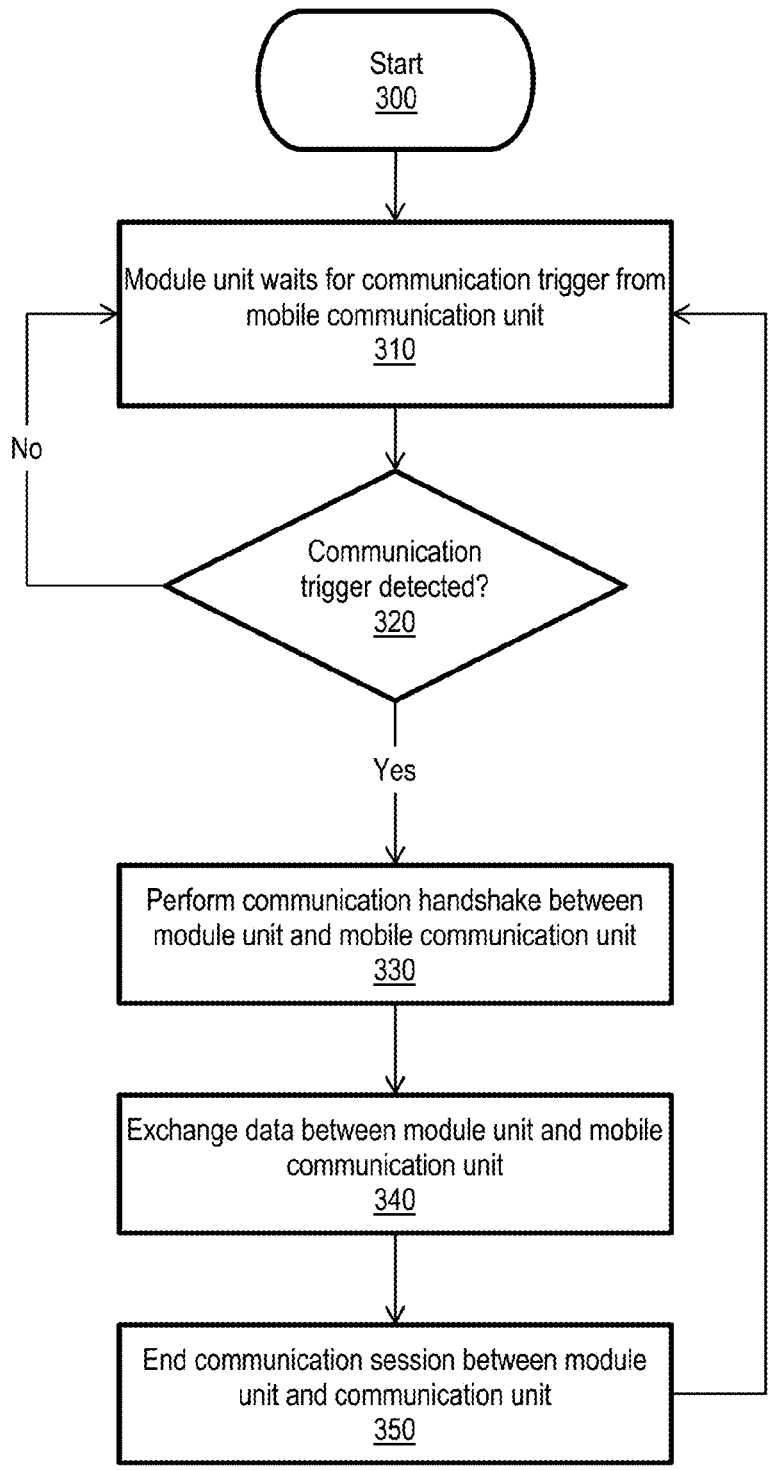
FIG. 3 is a flow diagram illustrating a method for communicating between a mobile communication unit and a module unit, in accordance with some embodiments.

FIG. 3 is a flow diagram illustrating a method for communicating between a mobile communication unit and a module unit, in accordance with some embodiments.

In various embodiments, the method of FIG. 3 may include additional (or fewer) blocks than illustrated. In some embodiments, the method described here may be performed by one or more of the systems described in FIGS. 1-2.

The method begins at 300 where, at block 310, the module unit waits for a communication trigger from the mobile communication unit. In some embodiments, the mobile communication unit may trigger the beginning of the communication when the mobile communication unit is within a certain proximity of the module unit. For example, when the mobile communication unit is within a certain proximity of the module unit, a trigger (such as a simple toggle switch) may be detected.

In other embodiments, the communication trigger may comprise the detection of a light signal, or the detection of vibration (caused by an approaching communication unit, for example). In yet other embodiments, the communication trigger may be a specific time or the passing of certain period of time since the last communication. In yet other embodiments, the communication trigger may be the reception of a communication trigger command from another device. For example, in embodiments where the mobile communication unit communicates with solar modules, the communication trigger command may be issued by a device such as an inverter coupled to the solar modules.

In response to detecting the trigger, the module unit may begin the communication protocol. If a communication trigger is not detected, decision 320 branches to the "no" branch, where, at block 310, the module unit continues to wait for a communication trigger from the mobile communication unit.

It should be noted that, in some embodiments, a handshake between the mobile communication unit and the module unit may not be implemented. For example, the module unit may be configured to transmit data continuously or periodically, which may then be received by the mobile communication unit in response to the mobile communication unit being in proximity of the module unit.

On the other hand, if the communication trigger is detected, decision 320 branches to the "yes" branch where, at block 330, the module unit and the mobile communication unit perform a communication handshake in order to begin communicating.

At block 340, the module unit and the mobile communication unit begin communicating and exchanging data. In some embodiments, the mobile communication unit and the module unit may be configured to communicate with each other using various media and/or various protocols such as short-range wireless radio, short-range wireless communications, wired protocols, light communication protocols, etc.

At block 350, the communication session between the module unit and the mobile communication unit is terminated, and the method continues at block 310 where the module unit again waits for another communication trigger.

Figure 4:
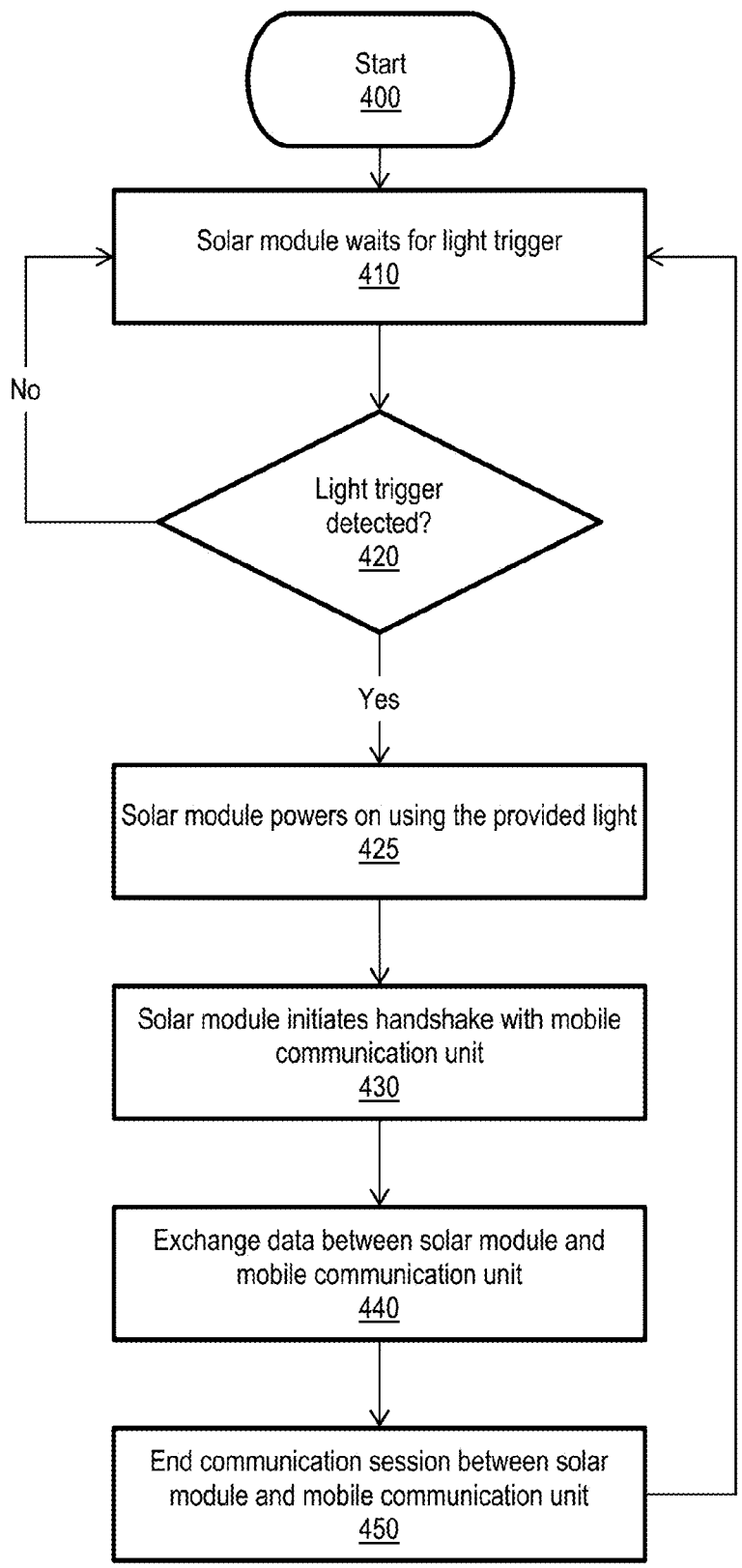
FIG. 4 is a flow diagram illustrating a method for communicating between a mobile communication unit and a solar module after waking the module unit using a light source, in accordance with some embodiments.

FIG. 4 is a flow diagram illustrating a method for communicating between a mobile communication unit and a solar module after waking the module unit using a light source, in accordance with some embodiments.

In various embodiments, the method of FIG. 4 may include additional (or fewer) blocks than illustrated. In some embodiments, the method described here may be performed by one or more of the systems described in FIGS. 1-2.

The method begins at 400 where, at block 410, the solar module waits for a light trigger from the mobile communication unit. The mobile communication unit may trigger the beginning of the communication session by transmitting light to the solar module when the mobile communication unit is within the proximity of the solar module. In some embodiments, the communication between the units may occur at night when sunlight is not present to otherwise trigger the solar modules.

If a light trigger is not detected, decision 420 branches to the "no" branch, where, at block 410, the solar module continues to wait for a light trigger from the mobile communication unit.

It should be noted that, in some embodiments, a handshake between the mobile communication unit and the module unit may not be implemented. For example, the module unit may be configured to transmit data continuously or periodically, which may be received by the mobile communication unit in response to the mobile communication unit being in proximity of the module unit.

On the other hand, if a light trigger is detected, decision 420 branches to the "yes" branch where, at block 425, the solar module powers on using the provided light. In some embodiments, the light may be provided to the solar modules using LEDs mounted on the mobile communication unit. In other embodiments, other sources of light may be used, such as lasers, florescent bulbs, incandescent, etc. It should also be noted that light in the infrared or ultraviolet range may also be used as well as electromagnetic radiation in other parts of the spectrum.

At block 430, the solar module and the mobile communication unit perform a communication handshake in order to begin communicating. In some embodiments, the solar module performs the handshake using power provided from the light received by the mobile communication unit.

At block 440, the solar module and the mobile communication unit begin communicating and exchanging data. In some embodiments, the mobile communication unit and the module unit may be configured to communicate with each other using various media and/or various protocols. For example, modulated light may be used for the communication. In embodiments where two-way communication is needed, the solar module may comprise its own light source and the mobile communication unit may comprise its own light detector.

In other embodiments, the light provided by the mobile communication unit may be used only for powering the solar module. As such, other means of communication may be used between the solar module and mobile communication unit such as short-range wireless radio, short-range wireless communications, wired protocols, etc.

At block 450, the communication session between the solar module and the mobile communication unit is terminated, and the method returns to block 410 where the solar module again waits for another light trigger.

One or more embodiments are disclosed. It should be noted that these and any other embodiments are exemplary and are intended to be illustrative rather than limiting. While what is disclosed is widely applicable to various types of systems, a skilled person will recognize that it is impossible to include all of the possible embodiments and contexts in this disclosure. Upon reading this disclosure, many alternative embodiments will be apparent to persons of ordinary skill in the art.

Those of skill will appreciate that the various illustrative logical blocks, modules, circuits, and steps described in connection with the embodiments disclosed herein may be implemented as hardware, firmware, software, or combinations of those. To illustrate clearly this interchangeability of hardware, firmware, and software, various illustrative components, blocks, modules, circuits, and steps have been described above generally in terms of their functionality. Whether such functionality is implemented as hardware or software depends upon the particular application and design constraints imposed on the overall system. Those of skill in the art may implement the described functionality in varying ways for each particular application.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein.

Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

The invention claimed is:

1. A method comprising:
moving a mobile communication unit along a plurality of module units, wherein the module units are configured to receive light energy and to convert the light energy to electrical energy;
exchanging data with one of the plurality of module units based at least upon the mobile communication unit being in proximity to the one of the plurality of module units; and
the mobile communication unit cleaning a light-receiving surface of the one of the plurality of module units substantially concurrently to exchanging data with the one of the plurality of module units.

2. The method of claim 1, further comprising the mobile communication unit emitting light, wherein the one of the plurality of module units is configured to power on based at least on receiving the light from the mobile communication unit.

3. The method of claim 2, wherein the mobile communication device being in proximity comprises the one of the plurality of module units receiving the light from the mobile communication device.

4. The method of claim 1, wherein the mobile communication device being in proximity comprises the mobile communication device triggering a switch coupled to the one of the plurality of module units.

5. The method of claim 1, further comprising the mobile communication unit identifying an identity of the one of the plurality of units with which the mobile communication unit is exchanging data.

6. A system comprising a mobile communication unit configured to:
move along a plurality of module units wherein the module units are configured to receive light energy and to convert the light energy to electrical energy,
exchange data with one of the plurality of modules based at least upon the mobile communication device being in proximity to the one of the plurality of module units, and
clean a light-receiving surface of the one of the plurality of module units substantially concurrently to exchanging data with the one of the plurality of module units.

7. The system of claim 6:
wherein the mobile communication unit is configured to emit light, and
wherein the one of the plurality of module units is configured to power on based at least upon receiving the light from the mobile communication unit.

8. The system of claim 7, wherein the mobile communication device being in proximity comprises the one of the plurality of module units receiving the light from the mobile communication device.

9. The system of claim 6, wherein the mobile communication device being in proximity comprises the mobile communication device triggering a switch coupled to the one of the plurality of module units.

10. The system of claim 6, wherein the mobile communication unit is configured to identify an identity of the one of the plurality of module units with which the mobile communication unit is exchanging data.

11. A system comprising a module unit, wherein the module unit is configured to receive light energy and to convert the light energy to electrical energy, wherein the module unit is configured to:
exchange data with a mobile communication device based at least upon the mobile communication device being in proximity to the module unit,
wherein the mobile communication unit is configured to clean a light-receiving surface of the module unit substantially concurrently to exchanging data with the module unit,
wherein the module unit is one of a plurality of module units, and
wherein the mobile communication device is configured to move along the plurality of module units.

12. The system of claim 11:
wherein the mobile communication unit is configured to emit light, and
wherein the one of the plurality of module units is configured to power on based at least upon receiving the light from the mobile communication unit.

13. The system of claim 12, wherein the mobile communication device being in proximity comprises the one of the plurality of module units receiving the light from the mobile communication device.

14. The system of claim 11, wherein the mobile communication device being in proximity comprises the mobile communication device triggering a switch coupled to the one of the plurality of module units.

15. The system of claim 11, wherein the mobile communication unit is configured to identify an identity of the one of the plurality of module units with which the mobile communication unit is exchanging data.

* * * * *